United States Patent
Bronowicki

(10) Patent No.: US 9,810,279 B2
(45) Date of Patent: Nov. 7, 2017

(54) VIBRATORY BANDGAP DEVICE

(75) Inventor: Allen J. Bronowicki, Laguna Niguel, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 690 days.

(21) Appl. No.: 12/807,660

(22) Filed: Sep. 10, 2010

(65) Prior Publication Data

US 2012/0061892 A1 Mar. 15, 2012

(51) Int. Cl.
*F16F 7/00* (2006.01)
*F16F 3/087* (2006.01)
*F16F 7/108* (2006.01)

(52) U.S. Cl.
CPC .................... *F16F 7/108* (2013.01)

(58) Field of Classification Search
CPC ...... F16F 3/087; F16F 7/00; F16F 1/38; F16F 1/40; F16F 1/50; F16F 1/373; F16F 1/403; F16F 1/406; F16F 7/108; F16F 2236/103; B60G 2202/143; B60G 2204/125; B60G 2204/4504; E04H 9/022; E04B 1/985
USPC ............ 267/136, 141.1, 141.2, 141.4, 141.5; 248/559, 633; 188/284, 378
See application file for complete search history.

(56) References Cited

U.S. PATENT DOCUMENTS

| | | | |
|---|---|---|---|
| 4,447,493 A | 5/1984 | Driscoll et al. | |
| 4,899,323 A * | 2/1990 | Fukahori | E04B 1/36 248/560 |
| 5,240,221 A | 8/1993 | Thomasen | |
| 5,330,165 A | 7/1994 | van Goubergen | |
| 5,339,580 A * | 8/1994 | Koshika | E04B 1/985 248/632 |
| 5,682,712 A * | 11/1997 | Kemeny | E04H 9/022 248/632 |
| 5,814,963 A | 9/1998 | Girard et al. | |
| 6,505,882 B1 | 1/2003 | Yamamoto et al. | |
| 2006/0261765 A1 | 11/2006 | Prasanna | |
| 2007/0069434 A1 | 3/2007 | Kato et al. | |
| 2008/0211447 A1 | 9/2008 | Prasanna | |
| 2008/0222975 A1* | 9/2008 | Nakata | E04H 9/022 52/167.9 |
| 2010/0007069 A1* | 1/2010 | Kawada | F16F 1/406 267/140.3 |

OTHER PUBLICATIONS

J.S. Jensen; Photonic band gaps and vibrations in one- and two-dimensinoal mass-spring structures; Journal of Sound and Vibration 266; 2003, pp. 1053-1078; Science Direct; DM.

(Continued)

*Primary Examiner* — Robert A Siconolfi
*Assistant Examiner* — San Aung
(74) *Attorney, Agent, or Firm* — Patti & Malvone Law Group, LLC

(57) ABSTRACT

A vibratory isolator in one example comprises at least one uniform mass inertia component and at least one uniform compliant component which are configured to exhibit a vibratory bandgap and which are configured to exhibit shear/bending coupling. A further implementation of the invention comprises a vibratory isolator comprised of an isolator and a plurality of disk inertias affixed to the isolator such that the vibratory isolator exhibits a vibrational bandgap in a predetermined frequency range.

17 Claims, 5 Drawing Sheets

(56) References Cited

OTHER PUBLICATIONS

C.Yilmaz, N. Kikuchi; Analysis and desing of passive band-stop filter-type vibration isolators for low-frequency aplications; Journal of Sound and Vibration 291; 2006, 1004-10.
Herbold, Kim, Nesterenko, Wang, Daraio; Tunable frequency bandgap and pulse propagation in a strongly nonlinear diatomic chain; Dept. Mechanical & Aerospace Eng.; US.
A. Spadoni, C. Daraio; Vibration Isolation via Linear and Nonlinear Periodic Devices; IDETC/CIE; 2009; detc2009-87620; Pasadena, CA.

* cited by examiner

VIBRATORY BANDGAP DEVICE

STATEMENT OF GOVERNMENT RIGHTS

This invention was made with Government support under Contract No. NRO000-09-C-0135 National Reconnaissance Organization (NRO). The government has certain rights in this invention.

TECHNICAL FIELD

The invention relates generally to isolators and more particularly to isolating vibrations by inducing a bandgap in a vibratory isolator.

BACKGROUND

Isolators are used in the field of vibration management. Vibration isolators try to isolate a vibration sensitive device (payload) from a vibratory disturbance (base motion). Typically vibration isolators are designed to be soft (low in natural frequency) so that base motion may be accommodated (absorbed) while reducing a force transmitted to the payload. Frequently it becomes difficult to lower an isolator's natural frequency to provide sufficient isolation at certain frequencies where excitations may be concentrated. For example, narrow-band vibration disturbances may occur in situations such as, spin rates of reaction wheels, control moment gyros on space craft, compressor drive speeds in refrigeration and cryocooler systems, and turbine and engine speeds.

Lowering an isolator's natural frequency is typically accomplished by softening a compliant element of an isolator. In lieu of softening the compliance, mass may be added to the payload to assist in lowering the natural frequency. Simply softening an isolator can make it sag due to gravity, leading to loss of clearance or high stresses in the flexural elements. Too much mass, either in the payload or the isolator, is undesirable in situations where light weight is required, especially in spacecraft and airplanes.

SUMMARY

The invention in one implementation encompasses a vibratory isolator. The vibratory isolator at least one mass inertia component and at least one compliant component which are configured to exhibit a vibratory bandgap, and which are configured to exhibit shear/bending coupling.

Another implementation of the invention encompasses a method of isolating vibrations comprising the steps of configuring a vibratory isolator comprised of at least one compliant component and at least one mass inertia component such that a vibratory bandgap occurs in the vibratory isolator and the vibratory isolator exhibits shear/bending coupling.

A further implementation comprises a vibratory isolator comprised of an isolator beam and a plurality of disk inertias affixed to the isolator beam such that the vibratory isolator exhibits a vibrational bandgap in a predetermined frequency range.

DESCRIPTION OF THE DRAWINGS

Features of example implementations of the invention will become apparent from the description, the claims, and the accompanying drawings in which:

DETAILED DESCRIPTION

Figure 1A:
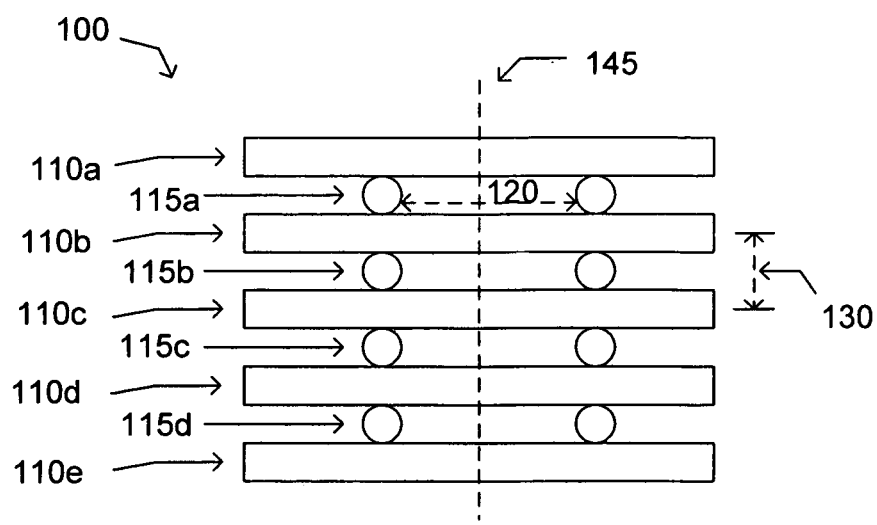
FIG. 1a is a front view of a first implementation of the vibratory isolator.

As explained, one method of providing isolation for unwanted vibrations may be to induce a bandgap in an isolating system. The bandgap provides a range of frequencies through which vibrations would not pass. Thus, for example, if one could induce a bandgap in an isolator at the frequencies of 100 hertz (Hz) to 200 Hz, then vibrations occurring within those frequencies would not pass through the isolator. If possible, the bandgap isolator should be self-supporting. In other words, a bandgap isolator should be constructed in such a manner that additional support is not needed, because supporting material would add unneeded weight to the system and the supporting material may have to be placed in contact with material comprising the bandgap isolator, thus affecting the performance of the isolator.

One attempt to construct a vibratory isolator involves forming a one dimensional periodic structure comprised of axial springs and masses of varying weights. An example of this configuration may be comprised of a first mass of 8 kilograms (kg) attached to a second mass of 2 kg by a spring of stiffness K, where K equals 1e6 Newtons/Meter (N/M), and an 8 kg third mass attached to the 2 kg mass by a spring stiffness K. This alternating pattern of odd (i.e., first, third, etc. position), heavy masses and light, even (second, fourth, etc. position), masses attached by said springs may be repeated until an isolator is formed. A bandgap is induced in a frequency range defined by the differing weights of the masses. An upper end of the bandgap may be $f_{upper}=(\text{sqrt}(2K/\text{even mass})/2\pi)$, and a lower end of the bandgap may be $f_{lower}=(\text{sqrt}(2K/\text{odd mass})/2\pi)$. If such an isolator is formed from masses of the same weight, the isolator will not exhibit a bandgap. Because the isolator is a one dimensional periodic structure, it cannot stand on its own and it does not exhibit shear/bending coupling. Shear/bending coupling may occur if a structure can stand on its own while withstanding shearing and rocking forces without need for an extra support structure to hold the isolator together as it withstands the shear and rocking forces.

Another way to construct an isolator that exhibits bandgaps is to form the isolator from spheres of varying mass where the spheres act as inertial weights and have compliance due to deformation surrounding the points of contact between neighboring spheres. In this configuration the spheres are placed on top of each other and held in place by an external tube. The external tube does not assist in inducing a bandgap in the isolator. Instead, the external tube acts as a support which holds the spheres so that the spheres may perform the function of an isolator. The tube actually adds extra weight that adds no vibration isolation function to the isolator. Further, because the tube is in contact with the spheres, friction between the tube and the spheres interferes with the bandgap properties of the spheres. Thus neither of these isolators exhibit shear/bending coupling, nor can either properly perform without the resistance of a lateral supporting structure.

Figure 1B:
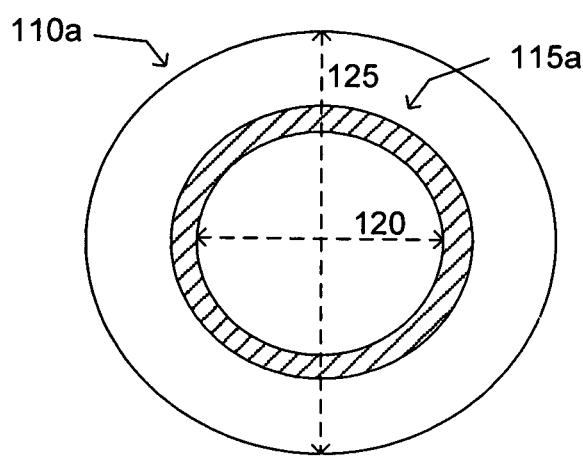
FIG. 1b is an over-head view of a portion of the first implementation of the vibratory isolator.

Turning to FIG. 1a, which depicts a front perspective of one embodiment of a vibratory isolator 100 that exhibits shear/bending coupling and is self-supporting. The view depicted in FIG. 1a shows the vibratory isolator 100 as if the isolator 100 were cut in half from top to bottom so that the viewer sees a cut-away view of the isolator 100. The depicted isolator 100 comprises five mass inertias or disks 110a-e, and four rings 115a-d. FIG. 1b depicts isolator 100 as seen from a top view with disk 110a removed such that ring 115a and disk 110b are exposed.

As depicted in FIG. 1a, an assembled isolator 100 forms a stack of alternating components where the components are comprised of a first component and a second component. In this embodiment, the first component may be a mass inertia such as a disk, and the second component may be a compliant substance such as a ring. The isolator 100 may be configured such that each ring 115a-d is sandwiched between two disks 110a-e, and each ring 115a-d is in contact with at least two disks 110a-e. Thus, for example, the ring 115b has a disk 110b resting on top of it 115b, and a disk 110c below it 115b. Each disk 110 is in contact with two rings except the top disk 110a and the bottom disk 110b. The stack may be formed by placing a first ring 115d on top of a disk 110e and alternating layers of rings 115 and disks 120, where a final disk 110a may be placed on top of the stack.

Depending on the embodiment, the disks 110a-e may be of varying diameters, thicknesses and materials. In the embodiment depicted, the disks 110a-e may have a diameter 125 ($D_m$) of approximately 10 inches, a thickness of ½ inches and in one embodiment the disks may be made of aluminum. The ring 115a-d may also take various forms depending on the embodiment. In an embodiment the rings 115a-d may be an o-ring made of ¼ inch thick Viton® and have a diameter 120 ($D_o$) of approximately 2 inches. In other embodiments the rings 115a-d may be springs, pads or any other material that may be formed into a shape that performs the compliant function needed to give the isolator 100 shear/bending coupling. Each ring 115a-d may have an axial stiffness of 1.1e6 Newton/Meter and a shear stiffness of 2.1e5 N/M. A vertical spacing 130 may separate the disks 110a-e. In an embodiment the vertical spacing 130 may be 4 inches. For example, the vertical spacing 130 between the midpoint of a profile of disks 110b and 110c may be 4 inches. The vertical spacing 130 may be adjusted to affect the bandgap. In some embodiments, if needed, spacers may be added to the rings 115a-d and disks 110a-e to adjust the vertical spacing 130.

As can be seen from the view depicted in FIG. 1b, the ring 115a is circular and rests substantially centered around an axis that projects through the center of the disk 110b where the axis is perpendicular to the face plane of the disk 110b. It can also be seen that the ring 115a may be one piece, comprise a circular shape, and have a diameter 120 that may be less than the diameter 125 of the disk 110b. Further the disk 110b may be substantially circular and sit around the same axis on which the ring 115a may be centered. The configuration of the embodiment depicted in FIG. 1a illustrates that the isolator may exhibit shear/bending coupling because the shear forces between neighboring disks, say between disks 110a and 110b, will induce a bending moment due to the spacing between the disks. Further, because there is no need for extra components to supply support, the overall weight of the vibratory isolator is kept to a minimum. When looking at FIGS. 1a and 1b it is readily apparent that the two components of the isolator 100 do not vary in size. In other words, the rings 115 may be all of the same size and the disks 110 may be all of the same size. One does not have to vary the sizes of the rings 115 and the disks 110 to induce a bandgap in the isolator. The uniform size of each component makes the isolator 100 more amenable to self-support.

In use, the isolator may be subjected to at least 4 different types of forces: shear, rocking, axial and torsion. In looking at FIG. 1a with respect to a 3-dimensional axis, the X axis is across the page, the Y axis is up and down the page and the Z axis projects out and perpendicular to the face of the page. A shear force may then be a force that is parallel to either the X or the Z axis. The rocking moment would lead to a vibratory rocking motion that occurs around either the X or Z axis. An axial force may be a force that occurs parallel to the Y axis, while a torsional moment may exist around the Y axis. Due to symmetry about the axial (Y) axis in this embodiment, axial and torsional forces are not coupled. Shear forces in X will couple with bending moments about Z, and shear forces in Z will couple with bending moments about X. As explained, the isolator 100 may exhibit band gaps in various frequency ranges depending on a configuration of the isolator, and the bandgap may occur with respect to shear, rocking, axial and torsional vibrations.

Figure 2:
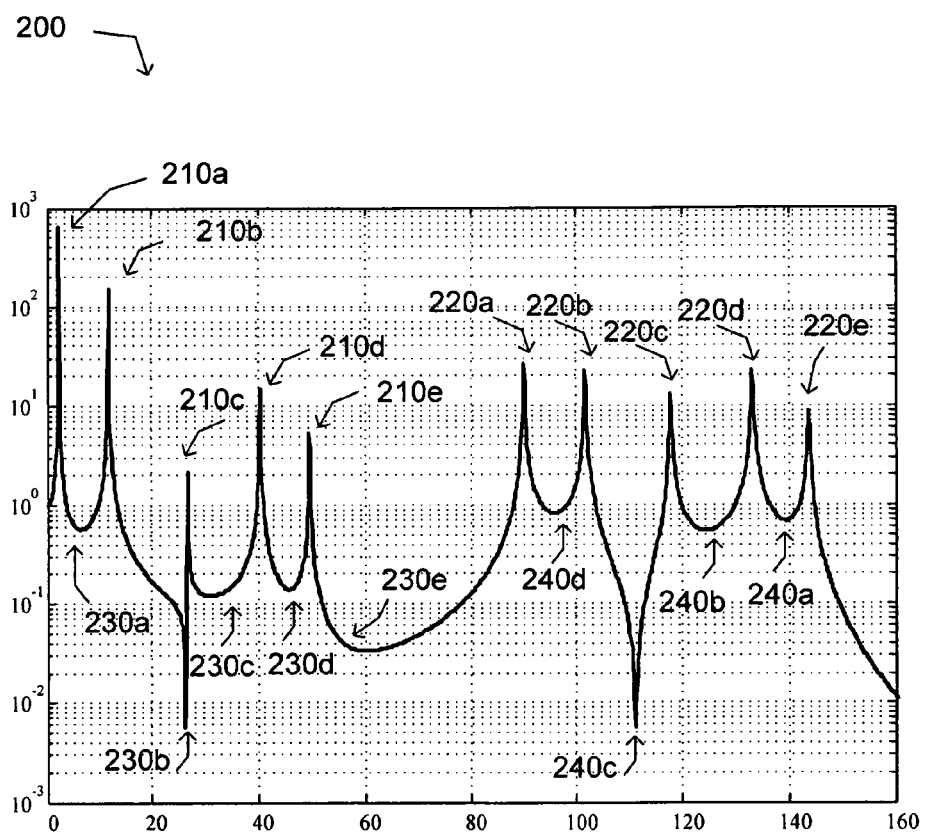
FIG. 2 is a graph of force transmissibility measured as a function of frequency using a vibratory isolator comprising five mass inertias.

Turning now to FIG. 2, which is a graph 200 that depicts shear force transmissibility of the isolator 100 as a function of frequency. The Y axis of the graph 200 shows force transmissibility in Newtons, and the X axis shows frequency of transmitted vibration measured in Hz. Natural frequencies of rocking modes 210a-e are depicted from approximately 2 Hz through 50 Hz. Natural frequencies of shearing modes 220a-e are depicted from approximately 90 Hz through 145 Hz. As one of ordinary skill in the art will readily appreciate, each mode possesses its own natural frequency of vibration, at which it will resonate. In the embodiment graphed, the isolator 100 has 5 rocking modes 210a-e and 5 shearing modes 220a-e. The number of shearing and rocking modes each corresponds to the number of disks in an isolator, thus the embodiment graphed comprises 5 disks. At each modal resonance 210a-e, 220a-e, the force transmissibility forms a peak of heightened transmissibility.

Troughs in transmissibility may be formed between the resonant peaks. The troughs between the rocking mode natural frequencies are shown as 230a-d and those between the shearing mode natural frequencies are shown as 240a-d. The trough 230e between the trailing rocking mode natural frequency 210e and the leading shearing mode natural frequency 220a may be particularly deep and broad, forming a bandgap. The depth of this bandgap may increase as the number of disks, or dynamically active masses, is increased; this relationship is discussed further in relationship to FIG. 3. The bandgap depth may approach that of an anti-resonance, a cancellation condition resulting from the destructive interference between response of the rocking modes and of the shearing modes. A greater number of disks may result in a greater degree of modal cancellation between rocking and shearing modes. The width of the bandgap may be increased by increasing the separation between the highest rocking mode frequency 210e and the lowest shearing mode frequency, 220a. The highest, or trailing edge of the rocking mode frequencies may be affected by a ratio of $D_m$ to $D_o$. In particular, the lower edge of the bandgap may be decreased by increasing the ratio of $D_m$ to $D_o$. Thus making the ring diameter 120 small in relation to the disk diameter 125 may create a large ratio of rocking inertia to rocking stiffness, thus lowering rocking frequencies. The highest, or leading edge of the shear mode frequencies may be increased by increasing the shear stiffness of the rings 115a-d.

The graph 200 thus depicts a bandgap. The bandgap may be a range of disturbance frequencies where a minimal amount of force is transmitted through the isolator 100. The band gap of isolator 100 is bounded by rocking mode 210e and shearing mode 220a, where rocking mode 210e occurs at approximately 50 Hz and rocking mode 220a occurs at approximately 85 Hz. In between these modes, a minimal amount of force may be transmitted through the isolator 100. To increase the width of the bandgap, the separation between the rocking mode and shearing mode frequencies may be adjusted. To adjust the edge of the bandgap bounded by rocking mode 210e, the ratio of the $D_m$ to $D_o$ may be adjusted as explained above. To adjust the edge of the bandgap bounded by shearing mode 220a, the axial stiffness and shearing stiffness of the rings 115a-d may be adjusted. To increase the depth of the bandgap, a greater number of disks and rings may be employed.

Figure 3A:
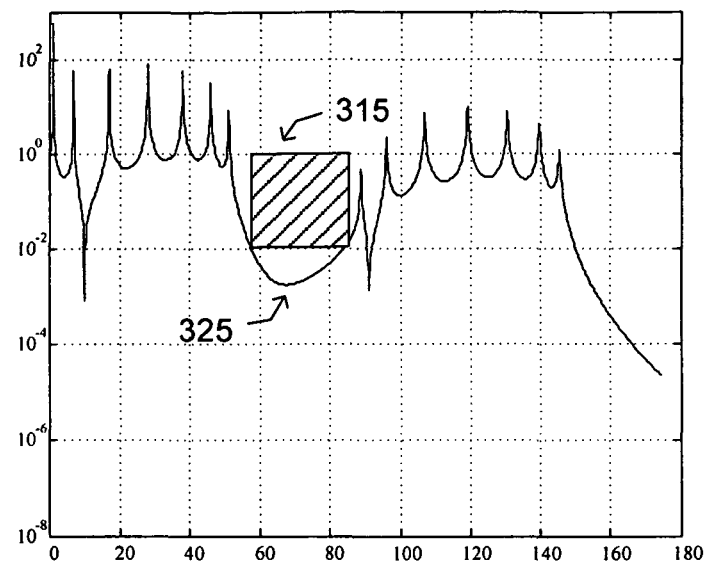
FIG. 3a is a graph of force transmissibility measured as a function of frequency using a vibratory isolator comprising seven mass inertias.
Figure 3B:
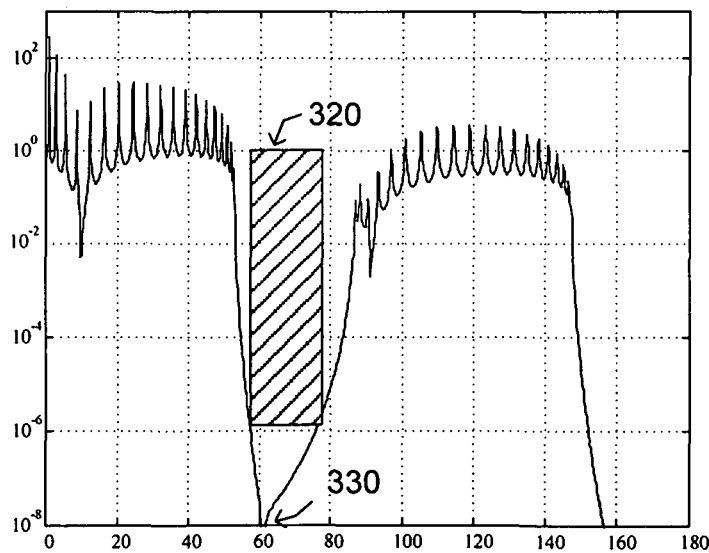
FIG. 3b is a graph of force transmissibility measured as a function of frequency using a vibratory isolator comprising twenty mass inertias.

Turning now to FIGS. 3a and 3b which comprise graphs 300, 310 that depict force transmissibility measured as a function of frequency using a vibratory isolator comprising seven and twenty mass inertias respectively. In both graphs 300, 310 a trough 325, 330 appears where the bandgap occurs. In FIG. 3b, which comprises an even number of mass inertias, there may be a sharp anti-resonance spike down in the transmitted force which may result in a sharp trough 330. In FIG. 3a, which comprises an odd number of mass inertias, the anti-resonance may be smoother and thus the resulting trough 325 may also be smoother. This may be generalized to other configurations comprising an odd or even number of mass inertias. That is, if the isolator 100 comprises an odd number of mass inertias, the bandgap trough may be smoother. If the isolator 100 comprises an even number of mass inertias, the bandgap trough may be sharp and the anti-resonance associated with the bandgap may be associated with a sharp spike down in the transmitted force. Regardless of whether the number of mass inertias is odd or even, the depth of the trough may increase as masses are added. In other words, as the number of mass inertias increases, the force transmitted through the isolator 100 may decrease. As previously explained, this result may occur because more mass inertias may lead to more rocking and shearing modes available to cancel each other, and through destructive interference, to cancel the vibration transmission. The depth of the bandgap is illustrated by boxes 315, 320 for the seven and twenty mass cases, respectively. Thus two orders of magnitude vibration attenuation are obtained using seven masses, while six orders of magnitude vibration attenuation are obtained using twenty masses.

Figure 4A:
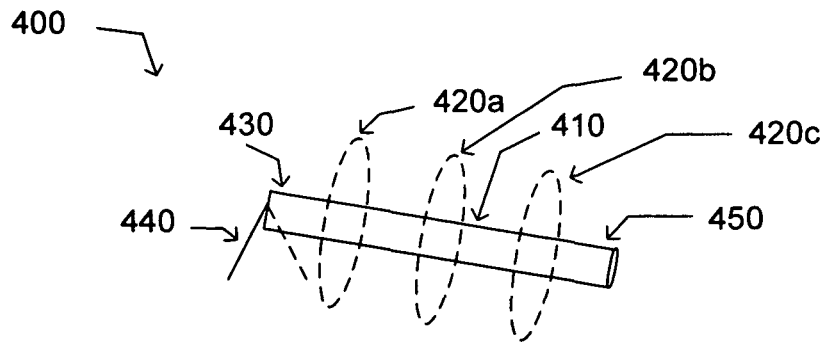
FIG. 4a is a second embodiment of the vibratory isolator.

Turning now to FIG. 4a which depicts a second embodiment of a vibratory isolator 400 which exhibits bandgaps at predetermined frequencies and exhibits shear/bending coupling. In this embodiment the vibratory isolator 400 may comprise a space telescope isolator beam 410 and a plurality of mass inertias 420a-c that are fixedly attached to the isolator beam 410. In a typical implementation, a first end 430 of the telescope isolator 410, which may comprise a bipod flexure 440, may be fixed to a spacecraft and a second end 450 may be fixed to a telescope. The vibratory isolator 400 prevents spacecraft vibrations from getting through to the telescope.

In one embodiment, telescope isolator 410 may be a Next Generation Space Telescope isolator that may be approximately 52 inches long and may have a diameter of approximately 2.5 inches. The mass inertias 420a-c may be fixedly attached to the space telescope approximately equidistant from each other. The telescope isolator 400 may project through the center of each mass 420a-c and perpendicular to the face plane of each mass 420a-c. Although 3 masses 420a-c are depicted in the embodiment shown in FIG. 4, other embodiments may comprise different number of inertial masses and the masses may have differing weights. In this embodiment, the isolator beam 410 provides compliance and support for the masses 420a-c.

Figure 4B:
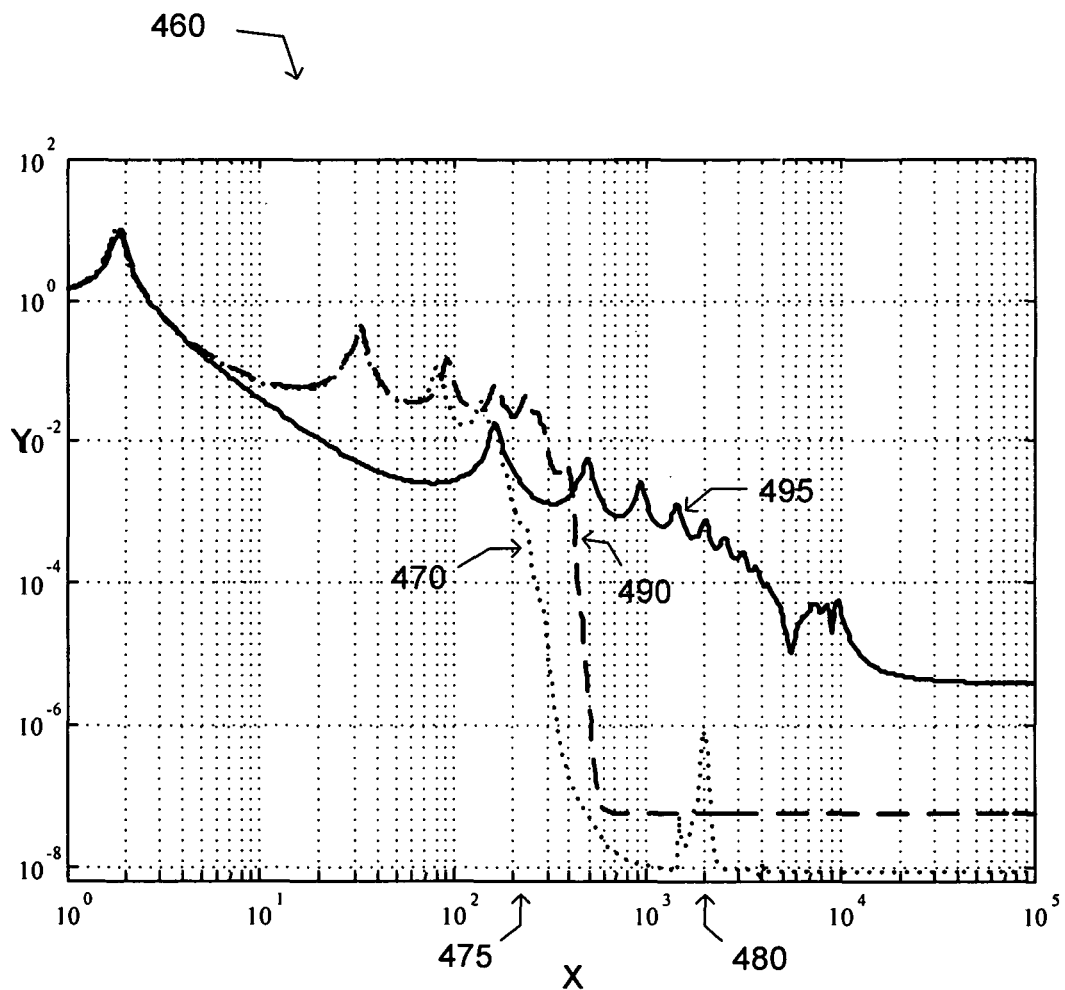
FIG. 4b is a graph of force transmissibility measured as a function of frequency using a vibratory isolator of the second embodiment comprising mass inertias of various masses and radii.

Turning now to FIG. 4b, which is a graph 460 that depicts force transmissibility of the isolator 400 as function of frequency of a force applied to the isolator 400. A Y-axis of the graph shows the transmitted force in Newtons and an X-axis shows the transmitted frequency in Hz. In practice, the force may be vibrations generated by a spacecraft. The graph 460 illustrates force transmissibility of three different configurations of the vibratory isolator 400. In a first configuration the vibratory isolator 400 comprises five 3 kilogram (kg) masses each with a radius of 5 inches where each mass may be fixedly attached to the telescope isolator 410. The force transmissibility associated with the first configuration is represented by the dotted line 470. As can be seen, a significant drop in force transmissibility, and thus a bandgap, occurs around 200 Hz. Arrows 475 and 480 depict the extent of the bandgap associated with the first configuration. A second configuration of vibratory isolator 400 comprises two 5 kg masses and two 2 kg where all the masses have a radius of 8 inches and the masses are affixed to the telescope isolator 410 such that the masses alternate by weight. The second configuration is represented by dashed line 490. As can be seen when looking at line 490, a significant drop in force transmissibility, and thus a bandgap, begins around 500 Hz. A force transmissibility of a third configuration is depicted by solid line 495. The third configuration is the telescope isolator without any attached masses. As can be seen by the graph of line 495, the telescope isolator without inertial masses does not exhibit a bandgap. Instead, the force transmissibility declines approximately linearly until the transmissibility flattens at approximately $10^{-5}$ Newtons and a frequency of approximately $10^4$ Hz.

Figure 5:
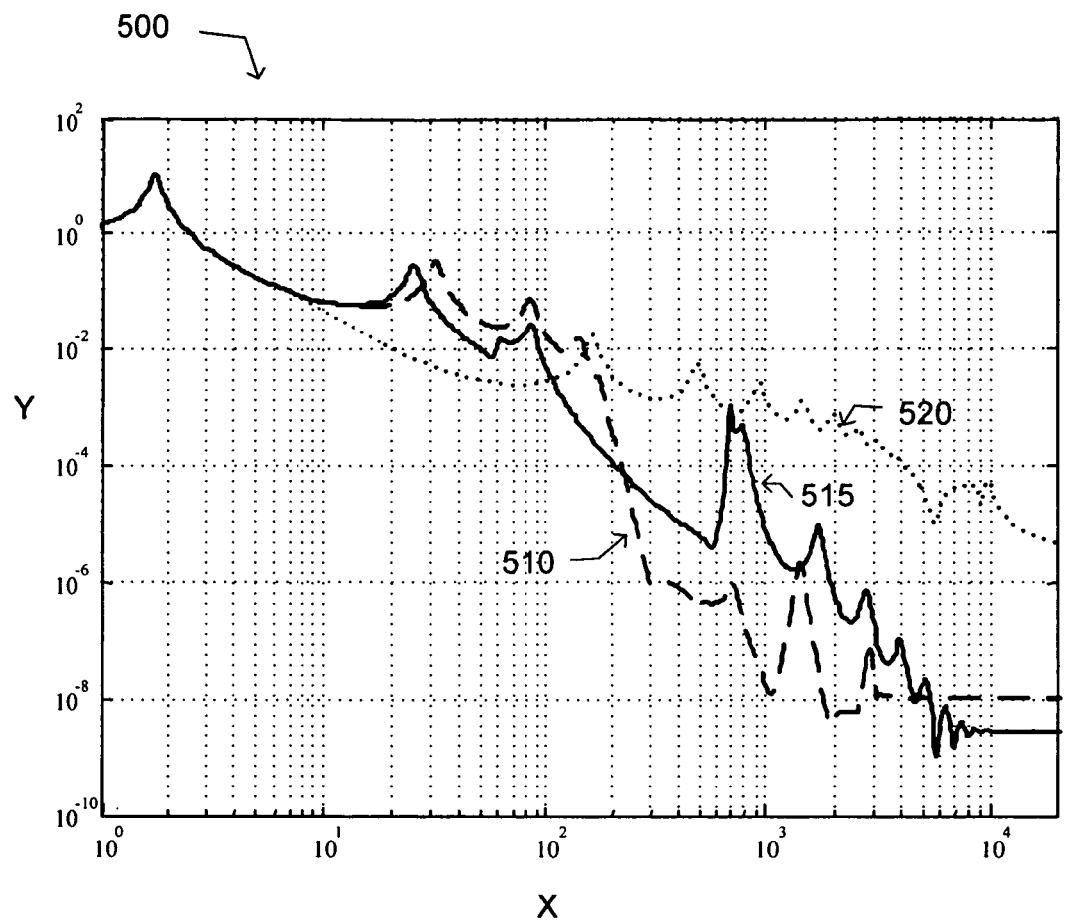
FIG. 5 is another graph of force transmissibility measured as a function of frequency using a vibratory isolator of the second embodiment comprising mass inertias of various masses and radii.

Turning now to FIG. 5, which is a graph 500 that depicts force transmissibility of further embodiments of the isolator 400 as a function of frequency of force applied to the isolator 400. An X axis of the graph shows the transmitted force in Newtons and a Y axis shows the transmitted frequency in Hz. In a fourth configuration, the vibratory isolator 400 comprises two 5 kg masses and one 2.5 kg mass each mass with a radius of 8 inches and each mass fixedly attached to the telescope isolator 410. The dashed line 510 represents the fourth configuration. As can be seen in the graph 500 a significant drop in force transmissibility, and thus a bandgap, occurs around 200 Hz. A solid line 515 represents a fifth configuration in which the telescope isolator 410 comprises two 10 kg masses each with a 10 inch radius. In the fifth configuration a bandgap may occur above 100 Hz and below 700 Hz. Because there are only 2 added masses, the bandgap is not as sharp or as deep as the bandgap isolator configurations employing a larger number of rigidly attached inertias. A dotted line 520 represents the transmissibility of the telescope isolator 410 without any masses attached. Just as in FIG. 4b, the line 520 indicates that the telescope isolator 410 without any attached masses does not show any bandgaps.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A vibratory isolator, comprising:
a periodic alternating structure comprising:
a plurality of mass inertia components, wherein at least one mass inertia component comprises a disk; and
a plurality of compliant components attaching adjacent mass inertia components to each other, wherein at least one compliant component comprises a ring,
wherein at least one ring is sandwiched between two disks, and
wherein at least one ring is in contact with at least two disks,
the periodic alternating structure alternating between the disks and the rings,
the vibratory isolator providing a vibratory bandgap having a range of frequencies through which vibrations cannot pass, the vibratory bandgap being bounded by an upper rocking mode frequency of approximately 85 Hertz (Hz), the vibratory bandgap being bounded by a lower shearing mode frequency of approximately 60 Hertz (Hz).

2. The vibratory isolator of claim 1, wherein each ring is in contact with at least two disks.

3. The vibratory isolator of claim 1, wherein each ring is in contact with exactly two disks.

4. The vibratory isolator of claim 1, wherein each ring is sandwiched between two disks.

5. The vibratory isolator of claim 1, wherein a top disk is in contact with one ring, a bottom disk is in contact with one ring, and each of the other disks is in contact with two rings except a top disk and a bottom disk.

6. The vibratory isolator of claim 1, wherein at least one disk has a diameter $D_M$ that is larger than a diameter $D_o$ of at least one ring.

7. The vibratory isolator of claim 6, wherein each ring has a diameter $D_o$, and wherein each disk has a diameter $D_M$ that is larger than the diameter $D_o$ of each ring.

8. The vibratory isolator of claim 6, wherein $D_m$, is approximately 10 inches, and $D_o$ is approximately 2 inches.

9. The vibratory isolator of claim 1, wherein at least one ring comprises at least one of an o-ring and a spring.

10. The vibratory isolator of claim 1, wherein at least one ring has an axial stiffness of approximately $1.1\times10^6$ newtons per meter (N/M), and wherein at least one ring has a shear stiffness of approximately $2.1\times10^5$ N/M.

11. The vibratory isolator of claim 1, wherein at least one disk is approximately ½ inches thick, and wherein at least one disk comprises aluminum.

12. The vibratory isolator of claim 1, wherein the vibratory isolator comprises 5 disks, and wherein the vibratory isolator further comprises 4 rings.

13. The vibratory isolator of claim 1, wherein the upper frequency comprises a shearing mode lower frequency.

14. The vibratory isolator of claim 13, wherein the shearing mode lower frequency is adjustable by adjusting a ratio of a mass of at least one disk and a shear stiffness of at least one spring.

15. The vibratory isolator of claim 1, wherein the lower frequency comprises a rocking mode upper frequency.

16. The vibratory isolator of claim 15, wherein the rocking mode upper frequency is adjusted by adjusting a ratio of $D_m$ to $D_o$.

17. A vibratory isolator, comprising:
a periodic alternating structure comprising:
a plurality of mass inertia components, wherein at least one mass inertia component comprises a disk; and
a plurality of compliant components attaching adjacent mass inertia components to each other, wherein at least one compliant component comprises a ring,
wherein a top disk is in contact with one ring, a bottom disk is in contact with one ring, and each of the other disks is in contact with two rings except a top disk and a bottom disk,
wherein each ring is sandwiched between two disks, and
wherein each ring is in contact with exactly two disks,
wherein each ring has a diameter $D_o$
wherein each disk has a diameter $D_M$ that is larger than the diameter $D_o$ the periodic alternating structure alternating between the disks and the rings,
the vibratory isolator providing a vibratory bandgap having a range of frequencies through which vibrations cannot pass,
the range of frequencies lying between a rocking mode upper frequency and a shearing mode lower frequency,
the rocking mode upper frequency being adjustable by adjusting a ratio of $D_m$ to $D_o$, and
the shearing mode lower frequency being adjustable by adjusting a ratio of a mass of at least one disk and a shear stiffness of at least one spring, the vibratory bandgap being bounded by an upper rocking mode frequency of approximately 85 Hertz (Hz), the vibratory bandgap being bounded by a lower shearing mode frequency of approximately 60 Hertz (Hz).

* * * * *